United States Patent [19]

Phillips

[11] Patent Number: 4,903,127
[45] Date of Patent: Feb. 20, 1990

[54] FIELD GENERATOR WITH INCOMPLETE LINE CORRECTION

[75] Inventor: Larry G. Phillips, Knoxville, Tenn.

[73] Assignee: North American Philips Corporation, New York, N.Y.

[21] Appl. No.: 373,679

[22] Filed: Jun. 23, 1989

Related U.S. Application Data

[63] Continuation of Ser. No. 261,202, Oct. 21, 1988, abandoned, which is a continuation-in-part of Ser. No. 209,452, Jun. 15, 1988.

[51] Int. Cl.⁴ .................. H04N 5/04; H04N 5/262
[52] U.S. Cl. ............................... 358/148; 358/149; 358/22; 358/183
[58] Field of Search .............................. 358/152

[56] References Cited

U.S. PATENT DOCUMENTS

| | | | |
|---|---|---|---|
| 4,248,213 | 2/1981 | Imaide et al. | 358/183 |
| 4,656,516 | 4/1987 | Fling et al. | 358/183 |
| 4,665,438 | 5/1987 | Miron et al. | 358/183 |
| 4,683,495 | 7/1987 | Brock | 358/148 |
| 4,724,487 | 2/1988 | Casey | 358/183 |
| 4,750,038 | 6/1988 | Welles et al. | 358/183 |

FOREIGN PATENT DOCUMENTS 0156420 12/1979 Japan ........................ 358/183

Primary Examiner—John W. Shepperd
Assistant Examiner—Michael D. Parker
Attorney, Agent, or Firm—Algy Tamoshunas; Marianne R. Rich

[57] ABSTRACT

Upon receipt of an interlaced television signal, the field generator generates a first selector signal arbitrarily selecting one of the fields as top field and a second field selector signal selecting the other as bottom field. The received television signal is entered into memory under control of the field selector signals. When readout from the memory occurs on the same line that is currently being recorded, the same field selector signal is maintained for another field, effectively switching the top and bottom assignments.

1 Claim, 3 Drawing Sheets

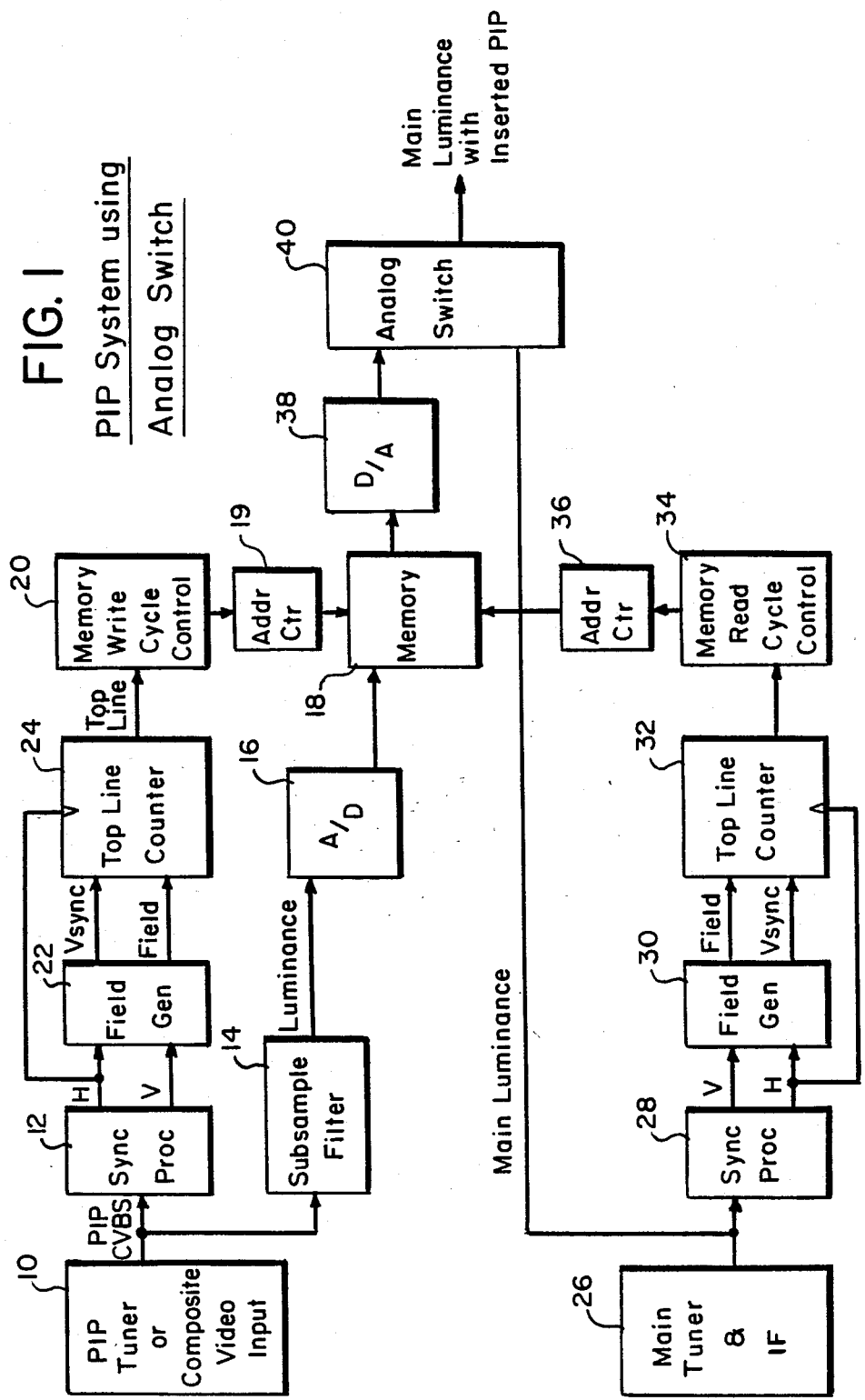

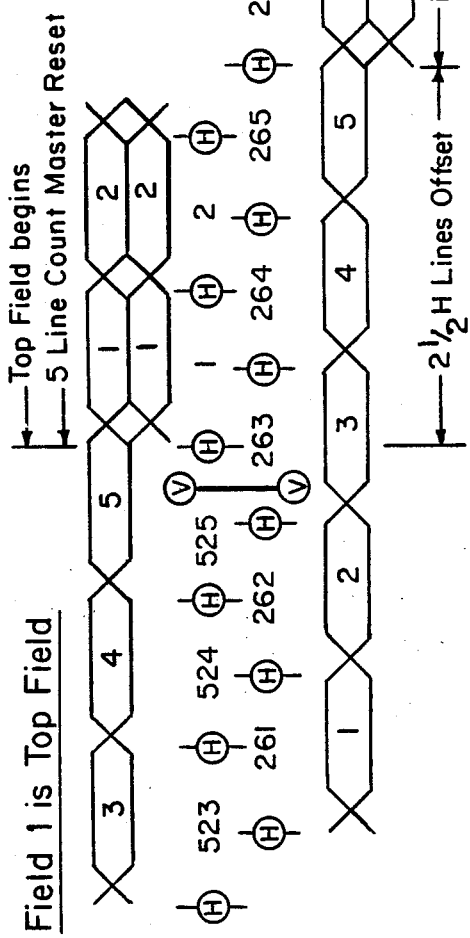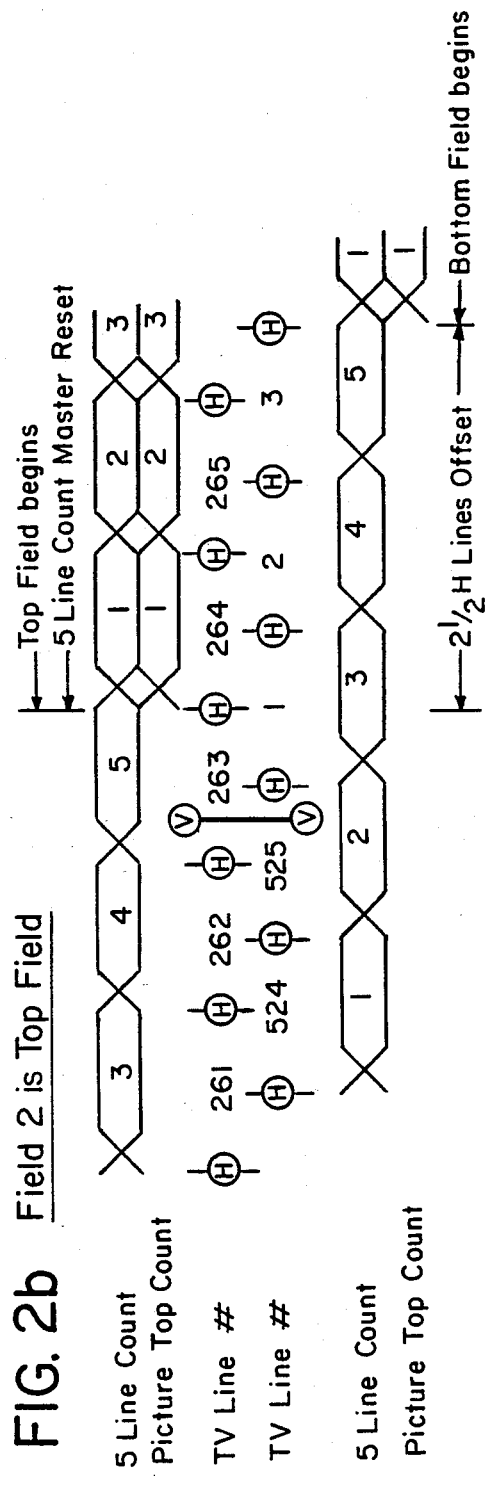

Generation of Incomplete Line Signal

Field Generator Schematic

FIELD GENERATOR WITH INCOMPLETE LINE CORRECTION

Cross-reference to related applications: This is a continuation of application Ser. No. 261,202 filed Oct. 21, 1988, now abandoned, which is a continuation-in-part application of Ser. No. 209,452, filed June 15, 1988, by the same inventor and assigned to the same assignee.

FIELD OF THE INVENTION

The present invention relates to a method and apparatus for recording and replaying interlaced signals such as, for example, television signals. In particular, it relates to the elimination of an artifact called incomplete line substitution which may occur in picture-in-picture (PIP) applications.

BACKGROUND OF THE INVENTION

The present invention will be described with reference to a television receiver having a picture-in-picture feature. As mentioned in the parent case, conventional processing of interlaced television signals is based on the assumption that the even fields, (i.e. the fields furnishing the even lines) and the odd fields (furnishing the odd numbered lines) must be maintained as such throughout all processing. The parent case introduced the concept of top field and bottom field, a concept which preserves the spatial relationship between the two fields without requiring identification of odd and even fields.

As in the parent case, the specific embodiment of the invention to be described is that of a field generator incorporated in a picture-in-picture (PIP) television system.

In a PIP system, a television signal from a second channel or another source is sub-sampled to decrease its size and displayed within a larger television signal. Specifically, in the vertical direction, every third line is maintained, while the remaining two lines are dropped. Similarly, the picture is horizontally sub-sampled so as to decrease its width. This reduced picture is stored in memory in write cycles controlled by the PIP source synchronization signals.

In order to be displayed as part of the main TV signal, the PIP signal must be read from memory in synchronization with the main signal. The signal read from memory must then be combined with the main TV signal (herein, as an example, the main luminance signal) to yield a main luminance signal with inserted PIP.

In this system, the PIP source and main picture source are asynchronous and tend to drift relative to each other. Due to this drift, and because the read-out takes place faster than the recording in the memory, the display side will at some time want to read from memory the same line in the same field that is currently being recorded. For the remainder of the PIP, the information read from memory will be a thirtieth of a second older than the information immediately preceding it. The same will occur on subsequent PIPs. This causes visible distortion, particularly in action scenes and when a camera change occurs.

SUMMARY OF THE INVENTION

It is an object of the present invention to correct the above-described error.

The correction is to take place with minimum addition to the field generator used to indicate top field and bottom field in accordance with the invention described in the parent case, and more specifically, for an embodiment of that invention having separate memory locations for top field and bottom field.

In accordance with the present invention, a field switch is instituted, i.e. a change from top to bottom or bottom to top field which would otherwise take place following the next received vertical synchronization signal is inhibited when the line read from memory on the display side is the same as the line currently being recorded in the same memory locations. The operation and construction of the present invention will best be understood from the following description of the preferred embodiment read in conjunction with the drawing.

BRIEF DESCRIPTION OF THE DRAWING

FIG. 1 is a schematic diagram of a picture-in-picture television system incorporating the present invention;

FIGS. 2a and 2b illustrate the basic operation of the invention disclosed in the parent case;

DESCRIPTION OF THE PREFERRED EMBODIMENT

Figure 4:
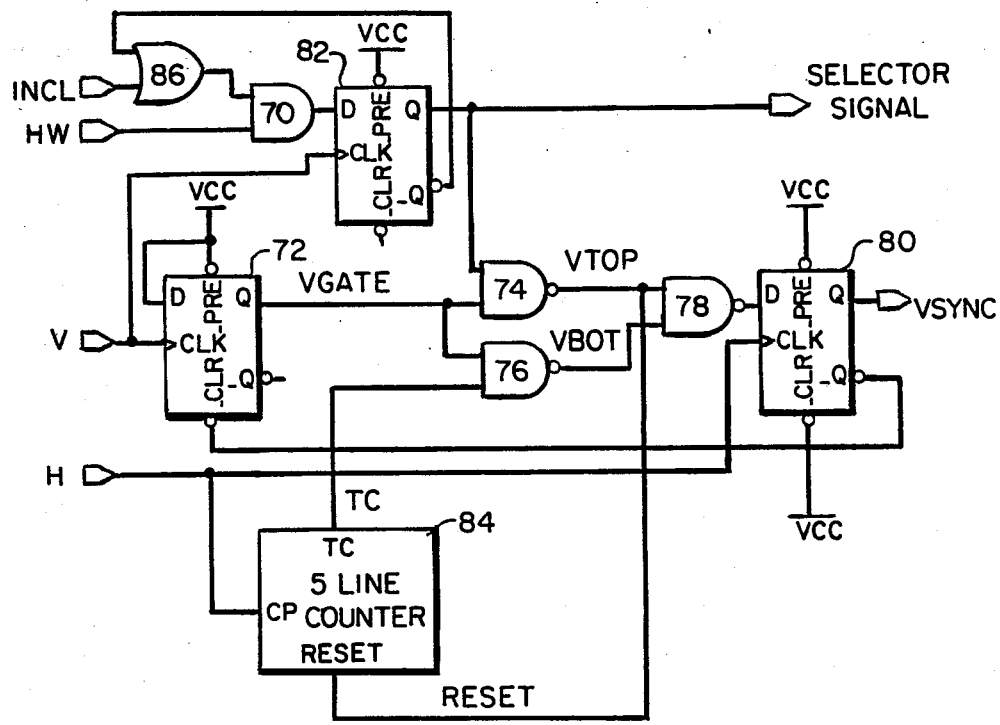
FIG. 4 is a schematic diagram of a field generator incorporating the present invention.

The overall diagram of a PIP system using an analog switch and incorporating the field generator of the present invention is illustrated in FIG. 1 (FIG. 4 in the parent case). In that figure, a PIP tuner and demodulator 10 furnishes a PIP baseband signal. A synchronization signal processor 12 removes the horizontal (H) and vertical (V) synchronization pulses from the baseband signal. At the same time, the luminance signal is extracted and applied to a sub-sample filter 14. The output of the sub-sample filter is subjected to analog/digital conversion. The output of analog/digital converter 16 is recorded in a memory 18 at addresses generated by an address counter 19 under control of a memory write cycle control 20. Control 20 is operative partially under control of PIP H and V synchronization signals.

Interconnected between synchronization signal processor 12 and memory write cycle control 20 is a field generator 22 and a top line counter 24. The field generator constitutes an embodiment of the present invention. Field generator 22 receives the horizontal and vertical synchronization pulses from the output of synchronization signal processor 12. The output of field generator 22 includes a regenerated vertical synchronization signal, VSYNC, and a so-called selector signal whose function and origin will be described below. Both signals at the output of field generator 22 are applied to a top line counter 24, also to be described below, which further receives the horizontal synchronization signals at the output of synchronization signal processor 12. The output of top line counter 24 is a top line signal which forms part of the control for memory write cycle control 20.

The main signal into which the PIP signal is to be incorporated is received at a main tuner and demodulator 26, similar in all respects to PIP tuner 10 if both PIP and main signals are broadcast signals. The output of stage 26 is a baseband signal which is subjected to synchronization signal separation in a stage 28. The output signals, V and H, are applied to a field generator 30 substantially identical to field generator 22. The output of this field generator, as was the output of field generator 22, are a selector signal and a regenerated vertical synchronization signal VSYNC. These signals are applied to a top line counter 32. Top line counter 32 also receives the main horizontal synchronization signal. The output of top line counter 32 is applied to a memory read cycle control stage 34. The output of stage 34 controls the read-out from memory 18.

The output from memory 18, furnished under control of stage 34, is applied to a digital/analog converter 38, whose output, in turn is applied to an analog switch 40. The second input to analog switch 40 is the main luminance signal derived from stage 26. The output of analog switch 40 is thus a main luminance signal with inserted PIP.

Before describing the operation and construction of the two field generators and top line counters, reference will be made to FIGS. 2a and 2b (FIGS. 5a and 5b in the parent case) which illustrate that either field 1 or field 2 may be top field when an interlaced picture is stored in/read out from memory.

A five line counter which counts five horizontal lines repetitively is used. Since the number of lines per frame is divisible by five for both NTSC and PAL systems, the field generator will be compatible with both of these TV systems. This five line counter is reset by the first horizontal synchronization signal after the vertical synchronization signal for every other field. This horizontal synchronization signal also switches the field selector signal from "1" to "0". The field on which the reset operation occurs becomes the top field. Thus, according to the top line of FIG. 5a, field 1 is the top field, while in FIG. 5b, field 2 is the top field.

For alternate fields there is no reset for the first horizontal synchronization signal following vertical synchronization. The top-to-bottom field change occurs when the five line counter reaches the count of 5 following receipt of the next vertical synchronization signal. As illustrated in FIGS. 2a and 2b, since there are 262½ lines per field, the next vertical synchronization signal will be received on count 2½ of the five line counter. The count of 5, i.e. the indicated start of bottom field, will take place 2½ counts later. Since the desired offset between top and bottom field is ½ a horizontal line for the main channel and 1½ horizontal lines for the PIP channel, a one or two line correction is required. How this is achieved is explained in the parent case and not relevant to the present invention.

It should, however, be noted here that the time relationship between the horizontal and vertical synchronization signals is irrelevant on the bottom field since the selector signal will always change in response to the horizontal synchronization signal following the count of five on the counter.

On the top field, however, movement of the vertical synchronization signal across the horizontal synchronization signal can cause interlace errors. It is therefore desired that the V signal at the input of the field generator become effective only if outside of a certain time zone around the horizontal synchronization signal. This time zone should be sufficiently large that there is little probability of the V signal jumping back and forth across it. On the other hand, as will be discussed below, an interlace error may occur when the V signal moves into the shaded area. Thus, a compromise must be reached. In a preferred embodiment, the shaded area is about one fourth of the horizontal line or approximately 16 microseconds.

The horizontal window signal (HW) applied to the field generator illustrated in FIG. 4 creates this zone. For alternate fields the field change will be inhibited whenever a vertical synchronization signal is within the predetermined zone of the horizontal synchronization signal.

The specific problem solved by the present invention is that the PIP and main synchronization signals drift with respect to one another, i.e. are asynchronous. Further signals are recorded in memory 18 during the time required for a full field. On the other hand, they are read from memory, at a much faster rate since the sub-sampled PIP picture will appear in only one-ninth of the area of the main picture. Thus if read-out occurs from the same line of the same field as is currently being recorded in memory, the read-out will overtake the recording and the portion of the PIP picture read out after the line in which equality between recording and read out occurs will be older than the portion above it. The same condition will occur in subsequent fields, since the drift of the main relative to the PIP picture is generally quite slow. It is thus the purpose of the present invention to cause a switch to the other field either on the recording or the read out side so that information during readout from top to bottom is progressively newer information, as is the case in conventional television.

Figure 3:
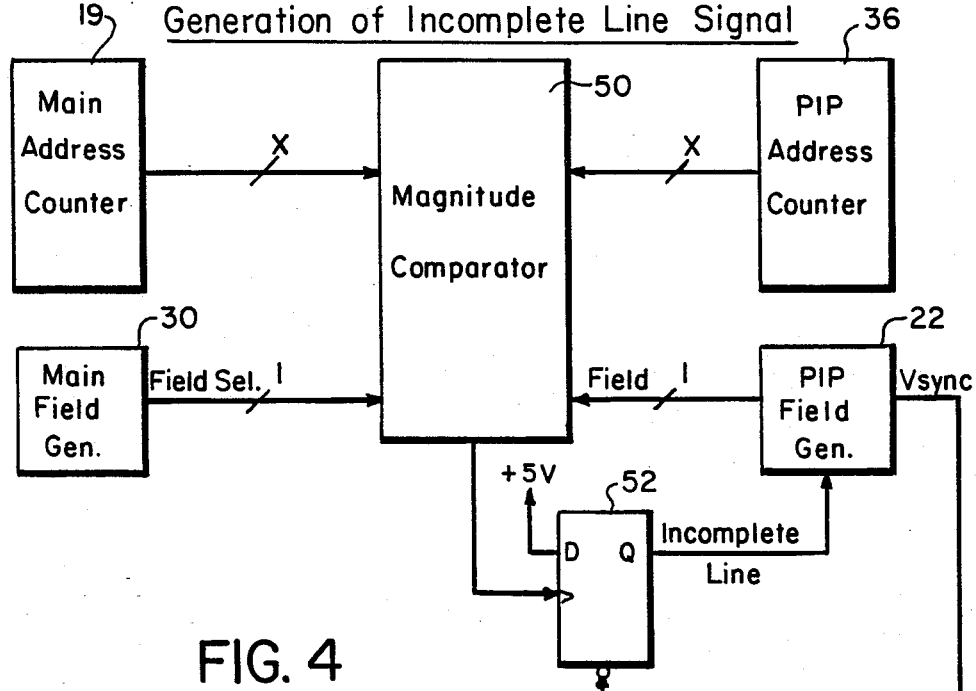
FIG. 3 is a schematic block diagram of an incomplete line signal generator.

Generation of a signal indicative that the same line is being read as is currently being recorded takes place as illustrated in FIG. 3. The signal is herein called the incomplete line signal. Referring now to FIG. 3, the main and PIP address counters, corresponding to address counters 19 and 36 in FIG. 1, generate addresses on a plurality of output lines. The address numbers are applied to a comparator 50. Comparator 50 also receives the selector signal output from the main field generator and the PIP field generator and compares the two. Specifically, the selector signal outputs are processed as the most significant address bit. When the addresses and the field selector outputs of the main television picture and the corresponding quantities of the PIP picture are equal, a 1 appears at the output of magnitude comparator 50. This "1" signal causes a "1" signal at the Q output of a flip-flop 52. The output of flip-flop 52 is the incomplete line signal. In FIG. 3, this is indicated as being applied to the PIP field generator 22. It could equally well be applied to the main field generator 30. The VSYNC output of the field generator to which the INCL signal was applied resets flip-flop 52.

A PIP field generator receiving an incomplete line signal is illustrated in FIG. 4. In FIG. 4, the incomplete line signal (INCL) from flip-flop 52 is applied to one input of an OR-gate 86 whose other input receives the $\overline{Q}$ output of a flip-flop 82. The output of OR-gate 86 is applied to one input of an AND-gate 70 whose other input receives the horizontal window (HW) signal. The output of AND-gate 70 is applied to the D input of flip-flop 82. The Q output of flip-flop 82 is the field selector signal.

Flip-flop 82 has a clock input which receives the incoming vertical synchronization signal (V) from either sync processor 12 or sync processor 28. For this embodiment, field generator 30 is chosen, so that the V signal is supplied by sync processor 28. The V signals also are applied to the clock input of the flip-flop 72. The D input of flip-flop 72 is tied to the DC supply voltage VCC. The Q output of flip-flop 72 furnishes a V-Gate signal which is applied to one input each of two NAND-gates 74, 76. The second input of NAND-gate 74 receives the field selector signal. The second input of NAND-gate 76 is tied to the terminal count (TC) output of a counter 84. The outputs of NAND-gates 74 and 76 are applied to respective inputs of a NAND-gate 78. The output of NAND-gate 74 is also tied to the reset input of counter 84. Counter 84 counts horizontal synchronization (H) signals applied to its counting input. The horizontal synchronization signals are also applied to the clock input of a flip-flop 80 whose D input receives the output of NAND-gate 78. The Q output of flip-flop 80 is the VSYNC signal. The $\overline{Q}$ output of flip-flop 80 is tied to the clear input of flip-flop 72.

In the operation of this field generator, contrary to that disclosed in the parent case, the horizontal window (HW) signal is designed to be high when the vertical synchronization signal occurs at an acceptable distance from the horizontal synchronization signal. Counter 84 resets when the VTOP signal is low.

Assuming now that the field selector signal is "0" which, for this particular embodiment signifies a bottom field, then a "1" signal will be applied to the first input of OR-gate 86. The output of OR-gate 86 is thus a "1" independent of the absence or presence of the incomplete line signal. During the time the HW signal is high, AND-gate 70 will have a "1" output. In response to an incoming V signal occurring during the time the output of AND gate 70 is high, a "1" signal will appear at the Q output of flip-flop 82. Thus, the field selector signal has switched to top field, independent of the absence or presence of the INCL signal. The latter is effective only on alternate fields in this embodiment.

The V signal which caused the selector signal to switch from 0 to 1 also causes the VGATE signal to go to 1, slightly delayed with respect to the field selector signal change. The output of NAND-gate 74 goes to 0, resetting the five line counter 84. NAND-gate 76 has a 1 at its output. The output of NAND-gate 78 is a 1. The H signal following the V signal which switched the field selector signal therefore clocks a 1 to the output of flip-flop 80, i.e. a VSYNC signal is generated. The $\overline{Q}$ output of flip-flop 80 is a 0 which clears flip-flop 72. This in turn causes the VGATE signal to go to 0, the output of NAND-gate 74 goes to 1, allowing counter 84 to resume counting. The output of NAND-gate 76 remains at 1, causing the output of NAND-gate 78 to be a 0. At the next horizontal sync pulse the VSYNC output therefore also goes to 0. The VSYNC signal thus exists for a one line interval as does the resetting of counter 84.

With the selector signal at 1 and the Q output of flip-flop 82 at 0, the output of OR-gate 86 will be a 1 or a 0 depending upon the state of the INCL signal. When the INCL signal is 0, indicating that readout is taking place from memory locations other than those in which recording is taking place, then the output of OR-gate 86 is 0 causing the output of AND-gate 70 to be a 0 independent of the state of the HW signal. The next V signal then causes a 0 to be clocked to the output of flip-flop 82, i.e. a field change from top to bottom field has occurred.

If, however, the INCL signal is 1 the output of OR-gate 86 will be a 1, causing the output of NAND-gate 70 to be a 1 during the time of the HW signal. The next V signal will therefore be ineffective, i.e. the selector signal will remain a 1. A field switch has occurred, i.e. the change in field which should have happened at this time has been suppressed.

If the selector signal has remained a 1, the operation is as described above. If, on the other hand, the field change occurred, i.e. if the selector signal is 0, the VTOP signal will be 1, while the VBOT signal will be 1 until the terminal count is reached. When the terminal count is reached the VBOT signal will go to 0, causing the output of NAND-gate 78 to go to a 1. As before, the 1 at the output of NAND-gate 78 will be clocked to the Q output of flip-flop 80 by the next H signal. A VSYNC signal is thus again generated.

The operation of the field generator in FIG. 4 is such that a VSYNC signal is generated for each incoming V signal. The VSYNC signal lasts the interval of one horizontal line. Further, in the absence of an incomplete line signal (INCL signal) each incoming V signal will cause a change in the field selector signal. This change will be inhibited for an incoming INCL signal during a top field. The fact that the INCL signal is effective for top-to-bottom changes only does not cause any visual difficulties in the display, since the duration of a field is only 1/60th of a second. It would of course be possible to devise a circuit in which the INCL signal is effective for both fields or only during bottom fields. Such embodiments would be obvious to one skilled in the art and are intended to be included in the claims.

It should further be noted that while the field selector signals are utilized as the most significant address bit in the embodiment illustrated in this application, this is a matter of convenience only and other embodiments could readily be devised for the address comparator scheme illustrated in FIG. 3.

Many of the changes from the particular embodiment illustrated herein will also be obvious to one skilled in the art and are intended to be encompassed in the following claims.

I claim:

1. Apparatus for receiving an interlaced signal having a first field and a second field timed by a first vertical synchronization signal and a second vertical synchronization signal respectively, and having, respectively, first lines timed by first horizontal synchronization signals and second lines timed by second horizontal synchronization signals, comprising:
    means for receiving said interlaced signal and generating a first field selector signal indicative of top field for an arbitrarily selected one of said first and second fields, and a second field selector signal signifying bottom field for the other of said first and second fields;
    memory means having a first group of memory locations and a second group of memory locations;
    means for recording top field information in said first memory locations and bottom field information in said second memory locations under control of said first and second field selector signals, respectively;
    means for reading said top field information and said bottom field information from said first and second memory locations; and
    means for maintaining said first field selector signal during receipt of the other of said first and second fields when said recording means and said readout means are simultaneously operative in the same one of said groups of memory locations.

* * * * *